(12) United States Patent
Park

(10) Patent No.: US 7,693,605 B2
(45) Date of Patent: *Apr. 6, 2010

(54) APPARATUS AND METHOD FOR CALLING MOBILE ROBOT

(75) Inventor: Jin-Seok Park, Seoul (KR)

(73) Assignee: LG Electronics Inc., Seoul (KR)

( * ) Notice: Subject to any disclaimer, the term of this patent is extended or adjusted under 35 U.S.C. 154(b) by 802 days.

This patent is subject to a terminal disclaimer.

(21) Appl. No.: 11/029,397

(22) Filed: Jan. 6, 2005

(65) Prior Publication Data

US 2006/0025887 A1 Feb. 2, 2006

(30) Foreign Application Priority Data

Jul. 30, 2004 (KR) .................. 10-2004-0060441

(51) Int. Cl.
*G06F 19/00* (2006.01)
*G05B 19/00* (2006.01)
*G01C 22/001* (2006.01)

(52) U.S. Cl. ............. 700/245; 700/259; 700/262; 701/23; 134/18

(58) Field of Classification Search ............. None
See application file for complete search history.

(56) References Cited

U.S. PATENT DOCUMENTS

| 4,023,178 | A | 5/1977 | Suyama |
| 5,440,216 | A | 8/1995 | Kim |
| 5,611,406 | A | 3/1997 | Matsuzaki et al. |
| 5,646,494 | A | 7/1997 | Han |
| 6,076,226 | A * | 6/2000 | Reed ................ 15/319 |
| 6,308,114 | B1 * | 10/2001 | Kim ................ 700/245 |
| 6,389,329 | B1 * | 5/2002 | Colens ............. 700/262 |
| 6,586,908 | B2 * | 7/2003 | Petersson et al. ...... 320/107 |
| 6,590,222 | B1 * | 7/2003 | Bisset et al. ........ 250/559.29 |
| 6,650,975 | B2 * | 11/2003 | Ruffner ............. 701/23 |
| 6,748,297 | B2 * | 6/2004 | Song et al. .......... 700/259 |
| 6,859,010 | B2 | 2/2005 | Jeon et al. |
| 7,133,746 | B2 * | 11/2006 | Abramson et al. ...... 700/259 |

(Continued)

FOREIGN PATENT DOCUMENTS

CN 1475332 2/2004

(Continued)

OTHER PUBLICATIONS

English Language Abstract of KR 10-2004-0023421.

(Continued)

*Primary Examiner*—Khoi Tran
*Assistant Examiner*—Ian Jen
(74) *Attorney, Agent, or Firm*—Ked & Associates, LLP

(57) ABSTRACT

An apparatus for calling a mobile robot includes a generator installed at a remote controller, and generating an RF signal and infrared signal for calling a mobile robot when a call signal is inputted by a user; and a controller installed at the mobile robot, calculating a direction of the remote controller based on a position of an infrared ray receiver that receives the infrared signal when an RF signal is received, rotating the mobile robot in the calculated direction, and then making the mobile robot to go straight ahead. When a user calls the mobile robot from a specific place, the mobile robot can move by itself to the specific space, thereby enhancing users' convenience.

6 Claims, 6 Drawing Sheets

U.S. PATENT DOCUMENTS

| | | | |
|---|---|---|---|
| 7,202,630 B2 * | 4/2007 | Dan | 320/115 |
| 7,274,167 B2 * | 9/2007 | Kim | 318/587 |
| 7,286,902 B2 * | 10/2007 | Kim et al. | 700/245 |
| 2002/0156556 A1 * | 10/2002 | Ruffner | 701/23 |
| 2003/0232649 A1 * | 12/2003 | Gizis et al. | 463/40 |
| 2004/0085222 A1 * | 5/2004 | Yoshikawa | 340/825.69 |
| 2004/0111184 A1 * | 6/2004 | Chiappetta et al. | 700/245 |
| 2004/0158354 A1 | 8/2004 | Lee et al. | |
| 2004/0211444 A1 * | 10/2004 | Taylor et al. | 134/18 |
| 2004/0236468 A1 * | 11/2004 | Taylor et al. | 700/245 |
| 2004/0244138 A1 * | 12/2004 | Taylor et al. | 15/319 |
| 2005/0000543 A1 * | 1/2005 | Taylor et al. | 134/18 |
| 2005/0010331 A1 * | 1/2005 | Taylor et al. | 700/245 |
| 2006/0069463 A1 * | 3/2006 | Kim | 700/245 |
| 2006/0235570 A1 * | 10/2006 | Jung | 700/245 |

FOREIGN PATENT DOCUMENTS

| | | |
|---|---|---|
| EP | 1435555 | 7/2004 |
| JP | 2002-224979 | 8/2002 |
| KR | 10 0397844 | 8/2003 |
| KR | 10-2004 0023421 | 3/2004 |

OTHER PUBLICATIONS

English Language Abstract of patent family member KR 10-2002-0049784.
English Language Abstract of JP 2002-224979.
English Language Abstract of CN 1475332.

* cited by examiner

APPARATUS AND METHOD FOR CALLING MOBILE ROBOT

BACKGROUND OF THE INVENTION

1. Field of the Invention

The present invention relates to a mobile robot and, more particularly, to an apparatus and method for calling a mobile robot.

2. Description of the Conventional Art

In general, a mobile robot is a device for automatically cleaning an area by sucking foreign substances such as dust from the floor while moving in a room (e.g., a living room) of a house by itself without user's manipulation.

In cleaning, the robot cleaner discriminates a distance from itself to an obstacle such as furniture, office supplies or a wall in a cleaning area through a distance sensor and selectively controls a motor for rotating its left wheel and a motor for rotating its right wheel according to the discriminated distance to thereby change its direction and automatically clean the cleaning area. Herein, the robot cleaner performs the cleaning operation while travelling in the cleaning area through map information stored in an internal storage unit.

For example, the robot cleaner includes a gyro sensor for sensing a direction of the robot cleaner, an encoder for determining a traveling distance by sensing the number of times of rotation of the wheel of the robot cleaner; an ultrasonic sensor for sensing a distance between the robot cleaner, a target; and an infrared ray sensor for sensing an obstacle, and other numerous sensors.

However, the conventional robot cleaner has shortcomings in that because numerous high-priced sensors are installed to perform cleaning by precisely traveling along a pre-set cleaning path, its internal structure is complicated and fabrication cost increases.

In an effort to solve such a problem, a robot cleaner has been developed to perform cleaning by traveling along an arbitrary cleaning path in a random manner.

A traveling device of the robot cleaner in accordance with a conventional art will now be described.

FIG. 1 is a block diagram showing the construction of the traveling device of a robot cleaner in accordance with a conventional art.

As shown in FIG. 1, the traveling device of a conventional robot cleaner includes: an obstacle sensing unit 1 for sensing an obstacle based on an impact amount generated when a robot cleaner going straight ahead in a specific area collides with the obstacle and generating an obstacle sense signal; a controller for stopping traveling of the robot cleaner based on the obstacle sense signal generated by the obstacle sensing unit 1, generating a random angle randomly, and generating a control signal for rotating the robot cleaner according to the random angle; a left motor driving unit 3 for rotating a left motor (ML) 5 of the robot cleaner at a certain speed according to the control signal of the controller 2; and a right motor driving unit 4 for rotating a right motor (MR) 6 of the robot cleaner at a certain speed according to the control signal of the controller 2.

FIG. 2 is a flow chart of a method for traveling a robot cleaner in accordance with the conventional art.

First, when a user inputs a cleaning command signal (step S1), the controller 2 generates a control signal to make the rotation speed of the left motor and the right motor 6 equal in order to making the robot cleaner go straight ahead, and simultaneously outputs the control signal to the left motor driving unit 3 an the right motor driving unit 4 (step S2).

The left motor driving unit 3 rotates the left motor 5 according to the control signal of the controller. At this time, the right motor driving unit 4 rotates the right motor 6 according to the control signal of the controller 2. Namely, as the left and right motors 5 and 6 are simultaneously rotated, the robot cleaner goes straight ahead.

The obstacle sensing unit senses an obstacle based on an amount of impact generated when the robot cleaner collides with the obstacle, generates an obstacle sense signal, and applies the obstacle sense signal to the controller 2 (step S3). If the obstacle sense signal is not generated, the robot cleaner continuously performs cleaning operation.

The controller 2 stops traveling of the robot cleaner according to the obstacle sense signal, generates a random angle randomly (step S4), generates a control signal for rotating the robot cleaner according to the random angle, and then outputs the generated control signal to the left and right motor driving units 3 and 4.

The left motor driving unit 3 rotates the left motor 5 according to the control signal of the controller 2, and the right motor driving unit 4 rotates the right motor 6 according to the control signal of the controller. In other words, by controlling the rotation speed of the left motor 5 and the rotation speed of the right motor 6 differently, the direction of the robot cleaner can be changed to a random angle (step S5).

Thereafter, when the robot cleaner is rotated as much as the random angle, the controller allows the robot cleaner to go straight ahead (step S6). When the cleaning operation of the robot cleaner is completed, the controller terminates the cleaning operation (step S7). If the cleaning operation of the robot cleaner is not completed, the controller allows the robot cleaner to repeatedly perform the cleaning operation.

If a user wants to move the robot cleaner to a specific place while the robot cleaner is performing the cleaning operation, the user should stop the operation of the robot cleaner and then picks up the robot cleaner personally to move it to the specific place. That is, the conventional robot cleaner has the problem that the user should personally pick up the robot cleaner and move it to a different cleaning space or a robot cleaner depository.

U.S. Pat. Nos. 5,440,216 and 5,646,494 also disclose a robot cleaner.

SUMMARY OF THE INVENTION

Therefore, an object of the present invention is to provide an apparatus and method for calling a mobile robot capable of making a mobile robot, such as a robot cleaner, by itself moved to a specific place when a user calls the mobile robot from the specific place, so that the user does not need to personally pick up the mobile robot to move it to a desired place, thereby enhancing user's convenience.

To achieve these and other advantages and in accordance with the purpose of the present invention, as embodied and broadly described herein, there is provided an apparatus for calling a mobile robot including: a generator installed at a remote controller, and generating an RF signal and infrared signal for calling a mobile robot when a call signal is inputted by a user; and a controller installed at the mobile robot, calculating a direction of the remote controller based on a position of an infrared ray receiver that receives the infrared signal when an RF signal is received, rotating the mobile robot in the calculated direction, and then making the mobile robot to go straight ahead.

To achieve the above object, there is also provided an apparatus for calling a mobile robot including: a generator installed at a remote controller, receiving a call signal from a user, and generating an RF signal and ultrasonic signal for calling a mobile robot; and a controller installed at the mobile robot, calculating a direction of the remote controller based on a position of an ultrasonic receiver which has received the ultrasonic signal when the RF signal was received, calculating a distance between the remote controller and the mobile robot based on time when the ultrasonic signal reaches the ultrasonic receiver, rotating the mobile robot in the calculated direction, and then making the mobile robot go straight ahead as long as the calculated distance.

To achieve the above object, there is also provided an apparatus for calling a mobile robot including: an RF generator installed at a remote controller and generating an RF signal for calling a mobile robot when a call signal is inputted by a user; an infrared ray generator installed at the remote controller and generating an infrared signal for indicating a direction of the remote controller when the call signal is inputted; an RF receiver installed at the mobile robot and receiving the RF signal generated from the RF generator; a plurality of infrared ray receivers installed at the mobile robot and receiving the infrared signal generated from the infrared ray generator; and a controller installed at the mobile robot, recognizing a direction of the remote controller based on a position of an infrared ray receiver that has received the infrared signal, among the plurality of infrared ray receivers, when the RF receiver receives the RF signal, rotating the mobile robot in the recognized direction, and making the mobile robot go straight ahead.

To achieve the above object, there is also provided an apparatus for calling a mobile robot including: an RF generator installed at a remote controller and generating an RF signal for calling a mobile robot when a call signal is inputted by a user; an ultrasonic wave generator installed at the remote controller and generating an ultrasonic signal for indicating a distance between the mobile robot and the remote controller when the call signal is inputted; an RF receiver installed at the mobile robot and receiving the RF signal generated from the RF generator; a plurality of ultrasonic wave receivers installed at the mobile robot and receiving the ultrasonic signal generated from the ultrasonic wave generator; and a controller installed at the mobile robot, calculating a direction of the remote controller and a distance between the mobile robot and the remote controller based on a position of an ultrasonic wave receiver that has received the ultrasonic signal, among the plurality of ultrasonic wave receivers, when the RF receiver receives the RF signal, moving the mobile robot to the remote controller based on the calculated direction and distance value.

To achieve the above object, there is also provided a method for calling a mobile robot including: a step in which when a call signal is inputted to a remote controller, an RF signal and an infrared signal for calling a mobile robot are generated through the remote controller; a step in which when the RF signal is received by the mobile robot, an operation mode of the mobile robot is switched to a call mode and a direction of the remote controller is calculated based on a position of an infrared ray receiver that has received the infrared signal, among a plurality of infrared ray receivers installed at the mobile robot; and a step in which a front side of the mobile robot is rotated in the calculated direction and then the mobile robot is allowed to go straight ahead.

To achieve the above object, there is also provided a method for calling a mobile robot including: a step in which when a call signal is inputted to a remote controller, an RF signal and an ultrasonic signal for calling a mobile robot are simultaneously generated through the remote controller; a step in which when the RF signal is received by an RF receiver of the mobile robot, an operation mode of the mobile robot is changed to a call mode and then a direction of the remote controller is calculated based on a position of an ultrasonic wave receiver, among a plurality of ultrasonic wave receivers installed at the mobile robot, that has received the ultrasonic signal; a step in which a distance between the remote controller and the mobile robot is calculated based on a time when the ultrasonic signal reaches the ultrasonic wave receiver; a step in which a front side of the mobile robot is rotated in the calculated direction; and a step in which the mobile robot is allowed to go straight ahead as long as the calculated distance value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

An apparatus and method for calling a mobile robot capable of making a mobile robot, such as a robot cleaner, by itself moved to a specific place when a user calls the mobile robot from the specific place, so that the user does not need to personally pick up the mobile robot to move it to a desired place, thereby enhancing user's convenience, in accordance with preferred embodiments of the present invention will now be described with reference to the accompanying drawings.

Figure 1:
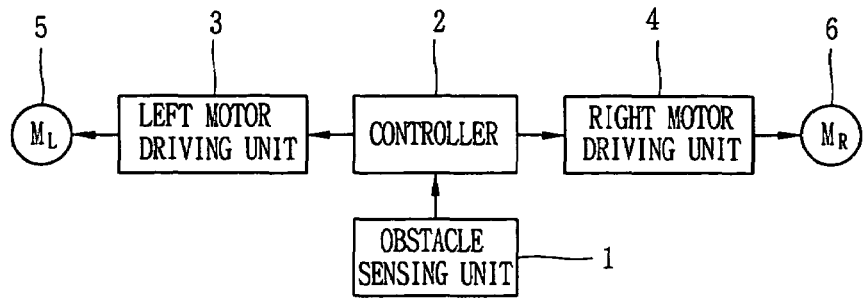
FIG. 1 is a block diagram showing the construction of an apparatus for traveling a robot cleaner in accordance with a conventional art.
Figure 2:
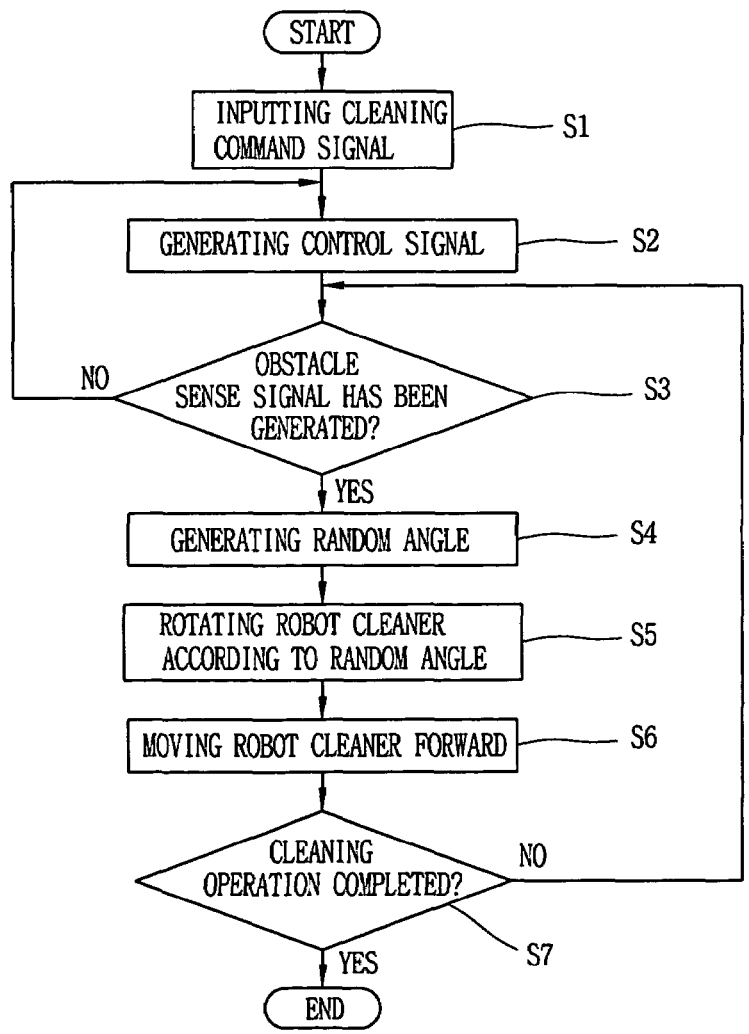
FIG. 2 is a flow chart of a method for traveling a robot cleaner in accordance with the conventional art.
Figure 3:
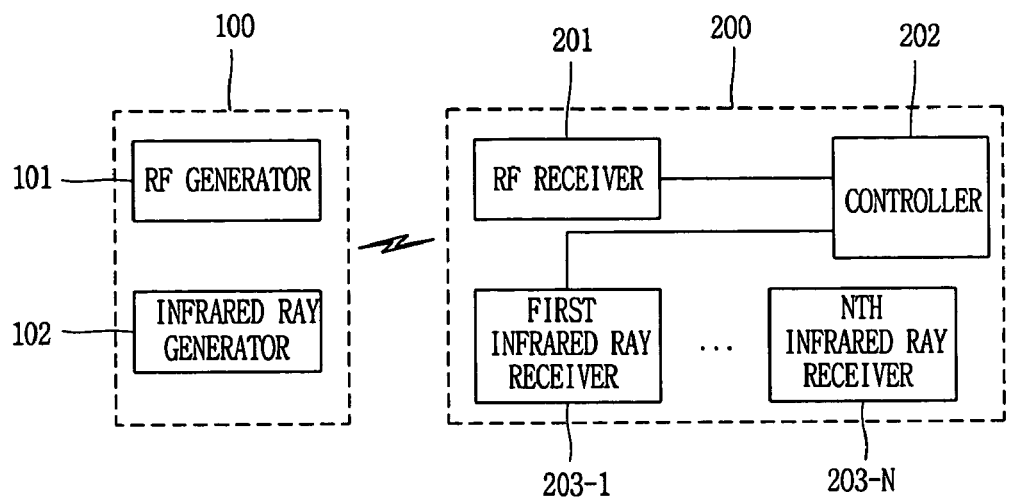
FIG. 3 is a block diagram showing an apparatus for calling a mobile robot in accordance with a first embodiment of the present invention.

FIG. 3 is a block diagram showing an apparatus for calling a mobile robot in accordance with a first embodiment of the present invention.

As shown in FIG. 3, an apparatus for calling a mobile robot in accordance with a first embodiment of the present invention includes: an RF generator 101 installed at a remote controller 100 and generating an RF signal for calling a mobile robot 200 when a call signal is inputted by a user; an infrared ray generator 102 installed at the remote controller 100 and generating an infrared signal for indicating a direction of the remote controller 100 when the call signal is inputted; an RF receiver 201 installed at the mobile robot 200 and receiving the RF signal generated from the RF generator 101; a plurality of infrared ray receivers 203-1~203-N installed at the mobile robot 200 and receiving the infrared signal generated from the infrared ray generator 102; and a controller 202 installed at the mobile robot 200, recognizing a direction of the remote controller 100 based on a position of an infrared ray receiver that has received the infrared signal, among the plurality of infrared ray receivers 203-1~203-N, when the RF receiver 201 receives the RF signal, moving the mobile robot 200 in the direction of the remote controller 100.

Positions of the plurality of infrared ray receivers 203-1~203-N installed at the mobile robot will be described with reference to FIG. 4.

Figure 4:
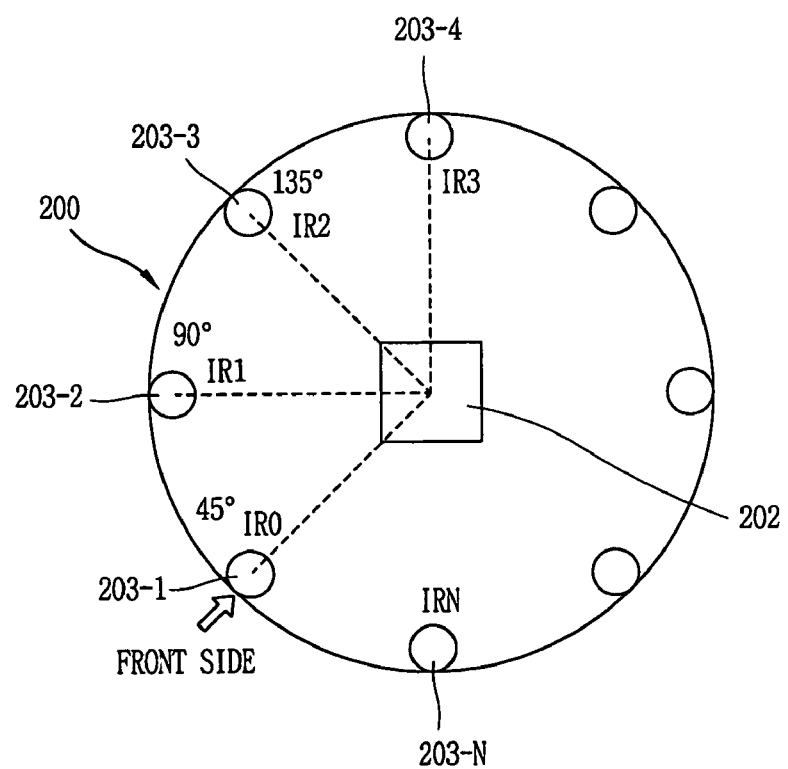
FIG. 4 is a schematic view shown a plurality of infrared ray receivers installed at the mobile robot in accordance with the first embodiment of the present invention.

FIG. 4 is a schematic view shown a plurality of infrared ray receivers installed at the mobile robot in accordance with the first embodiment of the present invention.

As shown in FIG. 4, the plurality of infrared ray receivers 203-1~203-N are preferably installed an certain intervals at an outer circumferential surface of the mobile robot 200 based the front side of the mobile robot 200, of which the first infrared ray receiver IR0 is preferably installed at the front side of the mobile robot 200 in order to set a reference angle (e.g., 0).

Figure 5:
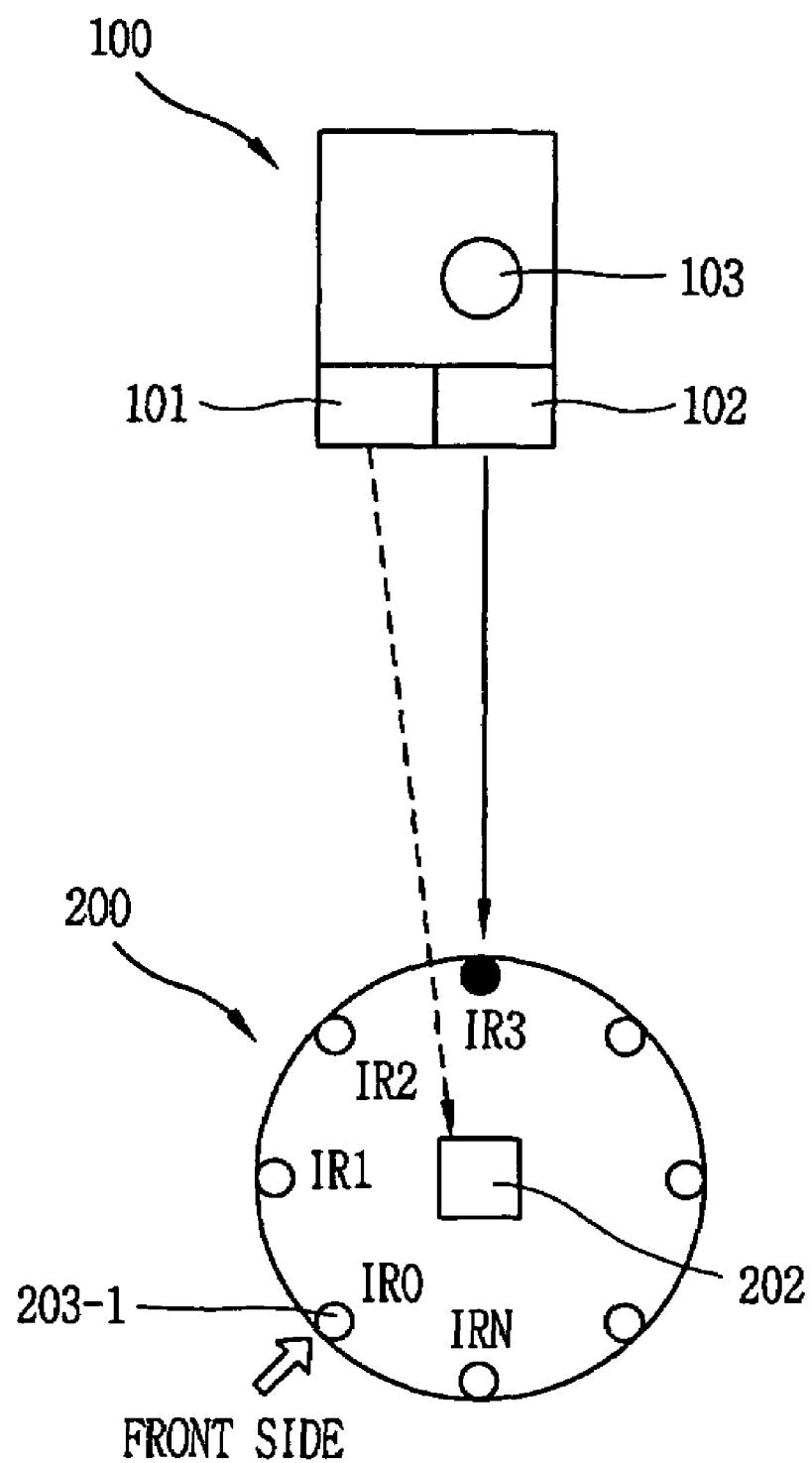
FIG. 5 is a schematic view showing a process of transmitting an RF signal and an infrared signal from a remote controller to the mobile robot in accordance with the first embodiment of the present invention.

FIG. 5 is a schematic view showing a process of transmitting an RF signal and an infrared signal from a remote controller to the mobile robot in accordance with the first embodiment of the present invention.

As shown in FIG. 5, a user directs a remote controller 100 toward the mobile robot 200 and presses a call button 103 installed on the remote controller 100. Then, an RF signal and an infrared signal are transmitted in the direction of the mobile robot 200. At this time, when the direction of the remote controller 100 and the direction of the mobile robot 200 correspond to each other, the infrared signal is received by a fourth infrared ray receiver IR3.

The operation of the apparatus for calling the mobile robot in accordance with the present invention will be described with reference to FIGS. 4 to 6 as follows.

Figure 6:
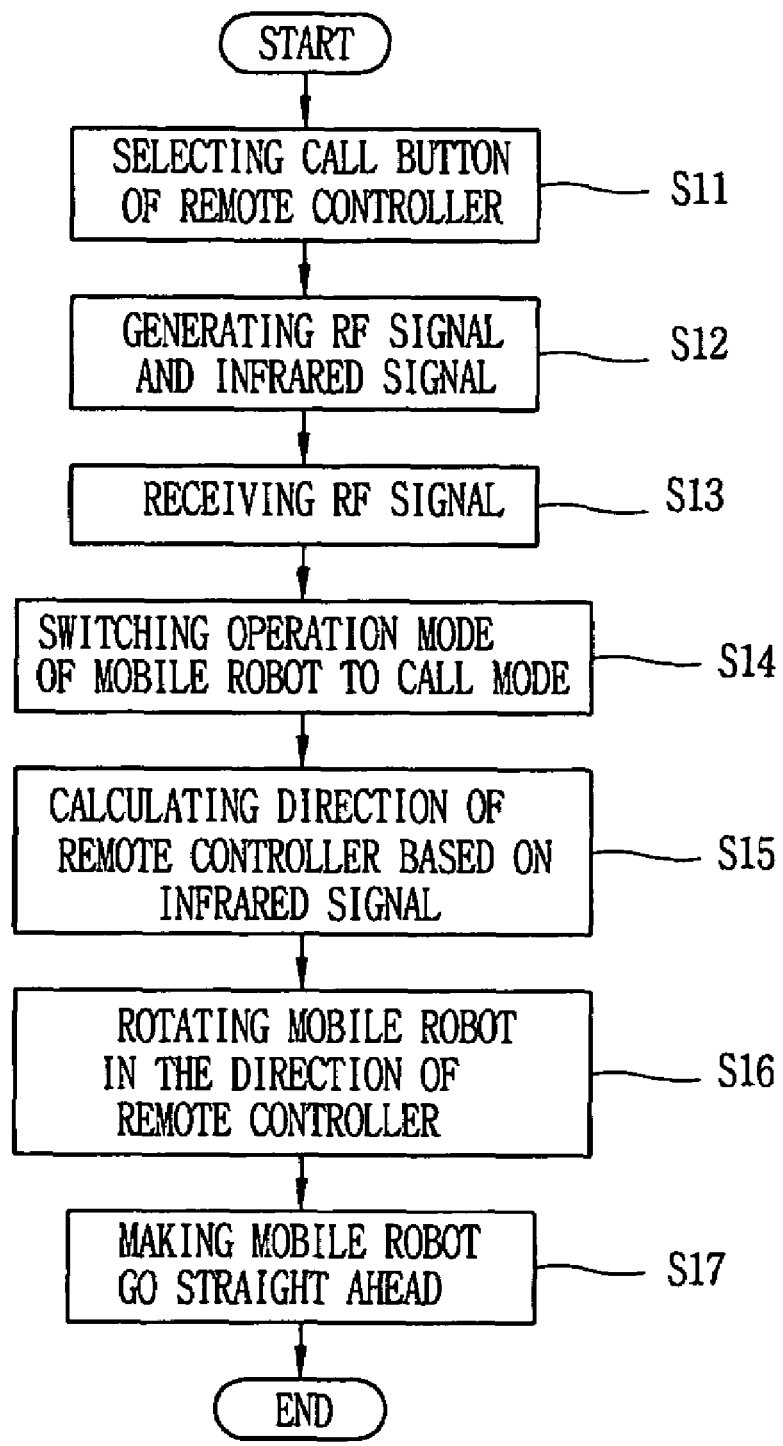
FIG. 6 is a flow chart of a method for calling the mobile robot in accordance with the first embodiment of the present invention.

FIG. 6 is a flow chart of a method for calling the mobile robot in accordance with the first embodiment of the present invention.

First, when the user selects the call button 103 of the remote controller 100 (step S11), the RF generator 101 installed at the remote controller 100 generates an RF signal for calling the mobile robot 200 and transmits the generated RF signal to the RF receiver 201 installed in the mobile robot 200.

When the user selects the call button 103 of the remote controller 100 (step S11), the infrared ray generator 102 installed in the remote controller 100 generates an infrared signal for informing about its direction and transmits the generated infrared signal in the direction of the mobile robot 200 (step S12). Herein, the direction of the infrared ray generator 102 means the direction of the remote controller 100.

Thereafter, the RF receiver 201 installed in the mobile robot 200 receives the RF signal transmitted from the RF generator 101. At this time, an infrared ray receiver positioned in the same direction as the infrared ray generator 102 (e.g., a fourth infrared ray receiver IR3) among the plurality of infrared ray receivers 203-1~203-N installed at the mobile robot 200 receives the infrared signal transmitted from the infrared ray generator 102.

And then, when the RF receiver 201 receives the RF signal, the controller 202 switches an operation mode of the mobile robot 200 to a call mode (step S14). In addition, the controller 202 calculates a direction of the remote controller 100 based on a position of an infrared ray receiver (e.g., the fourth infrared ray receiver IR3) that has received the infrared signal among the plurality of infrared ray signals 203-1~203-N (step S15). Herein, the controller 202 can include a storing unit (not shown) for storing pre-set position numbers for discriminating a position of the plurality of infrared ray receivers 203-1~203-N and determine a position of the infrared ray receiver that has received the infrared signal based on the pre-set position number of the infrared ray receiver.

For example, assuming that the fourth infrared ray receiver IR3 installed in the direction of 135° based on the first infrared ray receiver IR0 installed at the front side of the mobile robot 200 receives the infrared signal, the controller 202 can recognize that the remote controller 100 is positioned in the direction of 45° of the front side of the mobile robot 200 because the angle between the first infrared ray receiver IR0 and the fourth infrared ray receiver IR3 is 135°. Herein, in order to calculate the direction of the remote controller 100, the position number of the first infrared ray receiver is 0, preferably, the position number of the second infrared ray receiver is set as 1, the position number of the third infrared ray receiver is set as 2 and the position number of the fourth infrared ray receiver is set as 3, and the position number of the Nth infrared ray receiver is set as N.

Thereafter, the controller 202 calculates the direction of the remote controller 100 based on the position of the infrared ray receiver that has received the infrared signal, namely, the fourth infrared ray receiver IR3, rotates the front side of the mobile robot 200 in the direction of the remote controller 100 (e.g., 135°) (step S16), and then, allows the mobile robot to go straight ahead (step S17).

The controller 202 installed in the mobile robot 200 calculates the direction (y) of the remote controller 100 through equation (1) shown below:

$$y = 2(\pi/n) \times x \tag{1}$$

wherein 'n' is the total number of the plurality of infrared ray receivers installed at the mobile robot 200, and 'x' is the position number of the infrared ray receiver that has received the infrared signal generated from the infrared ray generator 102.

For example, if 'n' is 8 and 'x' is 0, the direction (y) of the remote controller 100 is 0°, and if 'n' is 8 and 'x' is 3, the direction (y) of the remote controller 100 is 135°. 'x'=0 means that the infrared ray receiver that has received the infrared signal is the first infrared ray receiver IR0 installed at the front side of the mobile robot 200, and 'x'=3 means that the infrared ray receiver that has received the infrared signal is the fourth infrared ray receiver IR3 installed in the direction of 135° based on the first infrared ray receiver.

Meanwhile, if the infrared signal is received by two or more infrared ray receivers, preferably, the middle point is calculated as a direction of the remote controller 100. For example, when the infrared ray receivers IR2~IR4 whose position numbers are 3 to 5 simultaneously receive the infrared signal, the middle value of 4 is preferably substituted for the 'x' value and if the infrared ray receivers whose position numbers are 5 to 8 simultaneously receive the infrared signal, a middle value of 6 and 7 is preferably substituted for the 'x' value.

A process of rotating the front side of the mobile robot 200 in the direction of the remote controller 100 and making the mobile robot 200 go straight ahead in the direction of the remote controller 100 will now be described with reference to FIG. 7.

Figure 7:
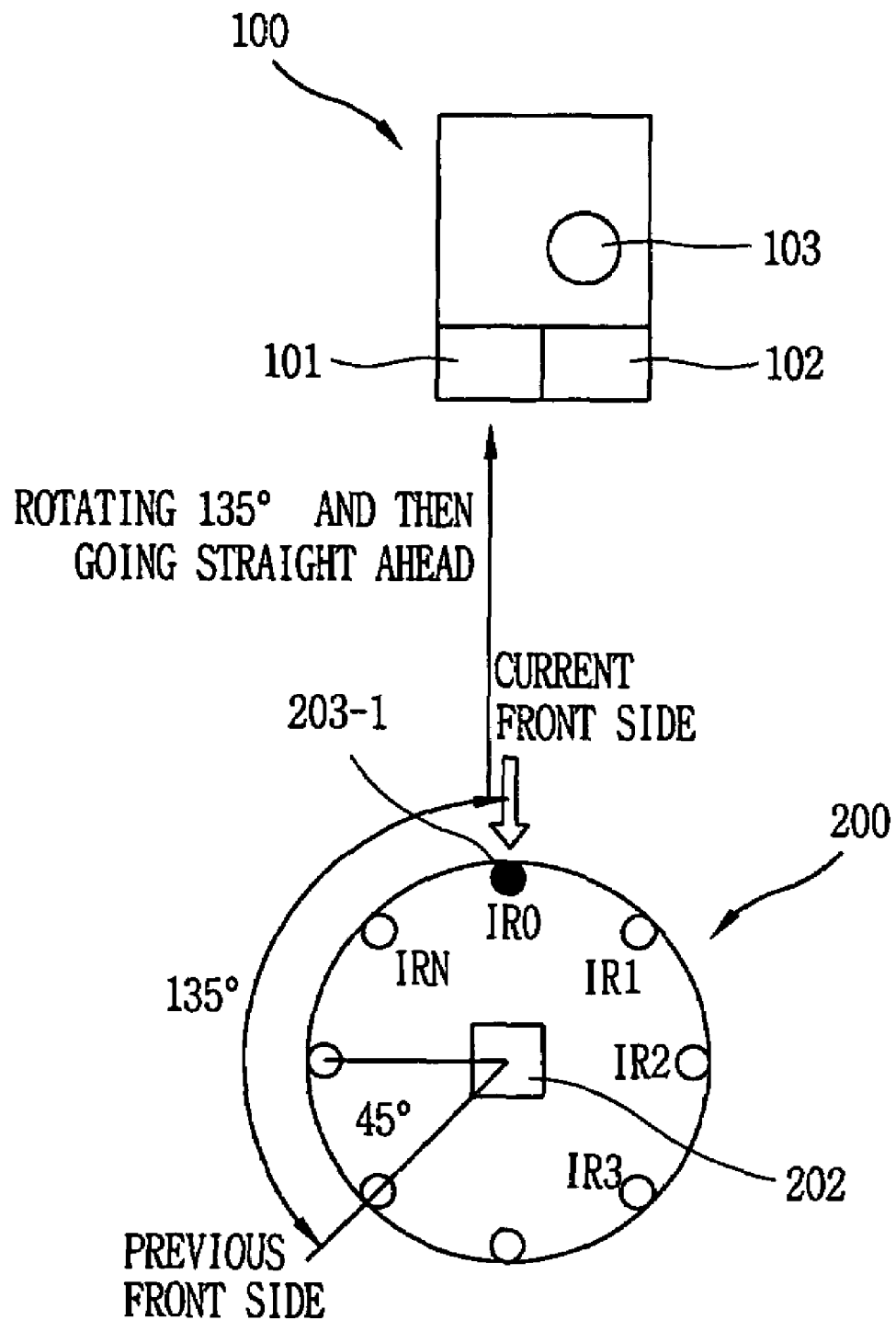
FIG. 7 is an exemplary view showing a process that a front side of the mobile robot is rotated in a direction of the remote controller and then the mobile robot is allowed to go straight ahead in accordance with the present invention.

FIG. 7 is an exemplary view showing a process that a front side of the mobile robot is rotated in a direction of the remote controller and then the mobile robot is allowed to go straight ahead in accordance with the present invention.

As shown in FIG. 7, assuming that the plurality of infrared ray receivers 203-1~203-N are installed at certain intervals at an outer circumferential surface of the mobile robot, an angle between adjacent infrared ray receivers (e.g., the first and second infrared ray receivers IR0 and IR1) is 45° and the infrared ray receiver that has received the infrared signal is the fourth infrared ray receiver IR3 among the plurality of infrared ray receivers 203-1~203-N, the controller 202 rotates the mobile robot 200 as much as 135° and then makes the mobile robot 200 go straight ahead.

In other words, since the angle between the first and fourth infrared ray receivers IR0 and IR3 is 135°, when the mobile robot 200 is rotated as much as 135°, the front side of the mobile robot faces the remote controller 100. Accordingly, when the mobile robot 200 is rotated 1350 and then allowed to go straight ahead, it would reach a point where the remote controller 100 exists.

When the mobile robot 200 reaches a place desired by the user, the user turns off the call button 103 to stop the mobile robot 200. For example, when the user turns on the call button 103, the controller 202 moves the mobile robot 200 in the direction of the remote controller, and when the user turns off the call button 103, the controller stops the mobile robot 200. Accordingly, when the user moves while pressing the call button 103 installed at the remote controller 100, the mobile robot 200 follows the user. In this case, the direction of the remote controller 100 preferably faces the mobile robot 200.

Likewise in the conventional art, the mobile robot 200 can be easily moved and rotated by controlling the left and right motor of the mobile robot 200, detained descriptions of which are thus omitted.

The apparatus for calling the mobile robot capable of automatically stopping the mobile robot 200 when it reaches the remote controller 100 by calculating the distance between the remote controller 100 and the mobile robot 200 as well as the direction of the remote controller 100 by using an ultrasonic wave generator and ultrasonic wave receivers, rather than using the infrared ray generator 102 and the plurality of infrared ray receivers 203-1~203-N.

Figure 8:
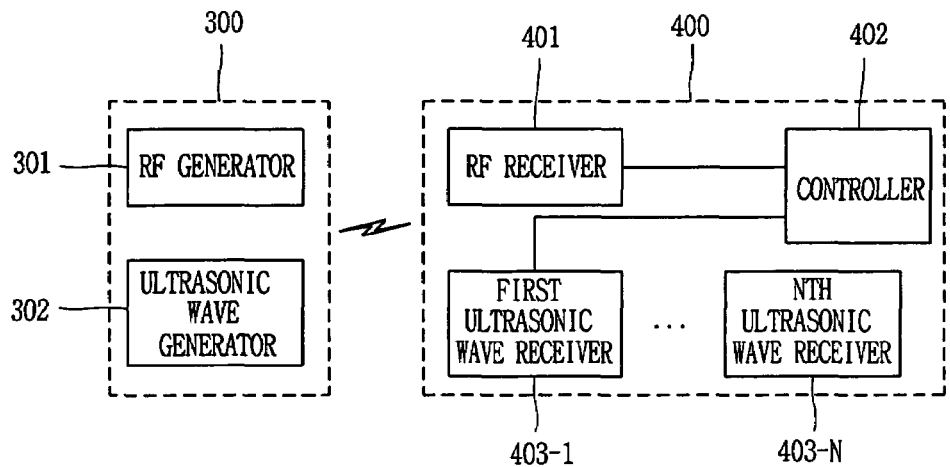
FIG. 8 is a block diagram showing the construction of an apparatus for calling a mobile robot in accordance with a second embodiment of the present invention.

FIG. 8 is a block diagram showing the construction of an apparatus for calling a mobile robot in accordance with a second embodiment of the present invention.

As shown in FIG. 8, an apparatus for calling a mobile robot in accordance with a second embodiment of the present invention includes: an RF generator 301 installed at a remote controller 300 and generating an RF signal for calling a mobile robot 400 when a call signal is inputted by a user; an ultrasonic wave generator 302 installed at the remote controller 300 and generating an ultrasonic signal for indicating a distance between the mobile robot 400 and the remote controller 300 when the call signal is inputted; an RF receiver 401 installed at the mobile robot 400 and receiving the RF signal generated by the RF generator 301; a plurality of ultrasonic wave receivers 403-1~403-N installed at the mobile robot 400 and receiving the ultrasonic signal generated from the ultrasonic wave generator 302; and a controller 402 installed at the mobile robot 400, recognizing a direction of the remote controller 300 based on the position of an ultrasonic wave receiver that has received the ultrasonic signal among the plurality of ultrasonic wave receivers 403-1~403-N when the RF signal is received by the RF receiver 401, calculating a distance between the remote controller 300 and the mobile robot 400 based on time when the ultrasonic signal received by the ultrasonic wave receiver, and moving the mobile robot 400 to the remote controller 300 based on the calculated direction and distance value.

Herein, preferably, the ultrasonic wave generator 302 and the plurality of ultrasonic wave receivers 403-1~403-N are installed at the mobile robot 400 in the same manner as the infrared ray generator 102 and the plurality of infrared ray receivers 203-1~203-N as shown in FIGS. 4, 5 and 7.

The operation of the apparatus for calling the mobile robot in accordance with the second embodiment of the present invention will now be described with reference to FIG. 9.

Figure 9:
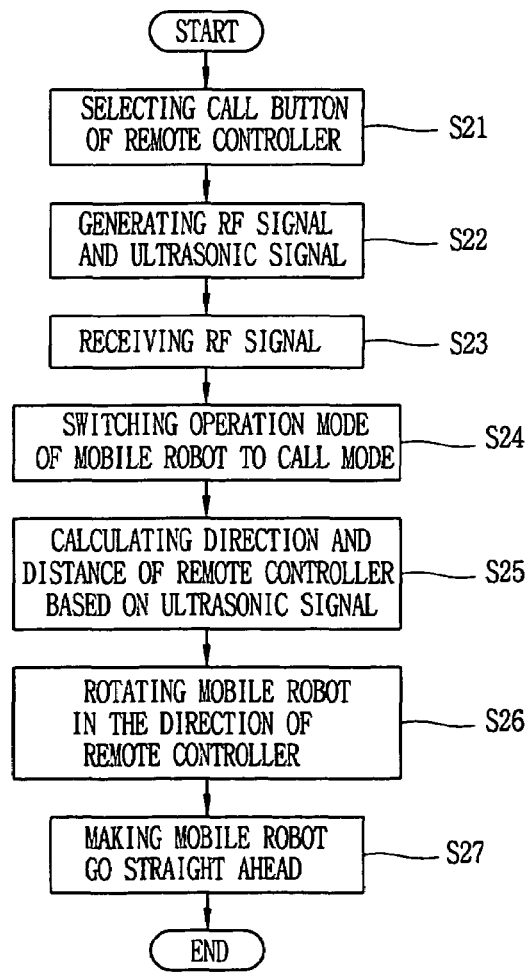
FIG. 9 is a flow chart of a method for calling the mobile robot in accordance with the second embodiment of the present invention.

FIG. 9 is a flow chart of a method for calling the mobile robot in accordance with the second embodiment of the present invention.

First, when a user selects a call button of the remote controller 300 (step S21), the RF generator 301 installed at the remote controller 300 generates an RF signal for calling the mobile robot 400 and transmits the generated RF signal to the RF receiver 401 of the mobile robot 400 (step S22).

When the user selects the call button 103 of the remote controller 300 (step S21), the ultrasonic wave generator 302 generates an ultrasonic signal for informing about a direction of the remote controller 300 and a distance between the remote controller 300 and the mobile robot 400 and transmits the generated ultrasonic signal in the direction of the mobile robot 400 (step S22).

The RF receiver 401 installed at the mobile robot 400 receives the RF signal transmitted from the RF generator 301 (step S23). At this time, the ultrasonic signal generated by the ultrasonic wave generator 302 is received by one or more ultrasonic wave receivers among the plurality of ultrasonic wave receivers 403-1~403-N.

When the RF signal is received by the RF receiver 401, the controller 402 switches an operation mode of the mobile robot 400 to a call mode (step S24). In addition, the controller 402 calculates a direction of the remote controller 300 based on the position of the ultrasonic wave receiver that has received the ultrasonic signal. At this time, the controller 402 detects time when the ultrasonic signal has reached the ultrasonic wave receiver and then calculates the distance between the mobile robot 400 and the remote controller 300 based on the detected time (step S25).

Thereafter, the controller 402 rotates a front side of the mobile robot 400 in the calculated direction (in the direction of the remote controller) (step S26) and then makes the mobile robot 400 go straight ahead as long as the calculated distance value. Namely, the controller 402 rotates the front side of the mobile robot 400 in the calculated direction (step S26) and then makes the mobile robot 400 go straight ahead as long as the calculated distance value (step S27) by controlling left and right motors of the mobile robot 400. Herein, the controller 402 can include a storing unit (not shown) for storing a pre-set position number for discriminating the plurality of ultrasonic wave receivers 403-1~403-N and determine a position of an ultrasonic wave receiver that has received the ultrasonic signal based on the position number of the ultrasonic wave receiver.

A process of calculating the direction of the remote controller 300 is the same as in the first embodiment of the present invention, descriptions of which are thus omitted.

The process for calculating the distance between the remote controller 300 and the mobile robot 400 based on the time when the ultrasonic signal reaches the ultrasonic wave receiver will now be described in detail.

First, the controller 402 detects time when the ultrasonic signal reaches one or more ultrasonic wave receivers after being generated from the ultrasonic wave generator 302 of the remote controller 300 based on point when an RF signal is generated as a reference, and calculates a distance between the mobile robot 400 and the remote controller 300 based the detected time.

For example, when one ultrasonic wave receiver (e.g., 403-1) receives the ultrasonic signal, the controller 402 obtains a distance between the ultrasonic wave receiver (e.g., 403-1) that has received the ultrasonic signal and the remote controller 300 based the time when the ultrasonic signal reached the ultrasonic wave receiver, and adds a semidiameter of the mobile robot 400 to the obtained distance value, thereby accurately calculating an actual distance between the mobile robot 400 and the remote controller 300.

If the ultrasonic signal is received by two or more ultrasonic wave receivers, the controller 402 calculates a distance between each ultrasonic wave receiver and the remote controller 300 based on time when the ultrasonic signal reaches the two or more ultrasonic wave receivers, and then, calculates an actual distance between the mobile robot 400 and the remote controller 300 through trigonometric measurement based on each calculated distance value. The distance between the mobile robot 400 and the remote controller 300 can be calculated by equation (2) shown below:

$$S = 340 [m/\text{sec}] \times (T1 - T2) \qquad (2)$$

wherein 340 [m/sec] is a sonic velocity, T1 is time when the ultrasonic signal is received, and T2 is time when the ultrasonic signal is generated after the RF signal is received.

The apparatus for calling the mobile robot can be applied to various moving apparatus as well as the mobile robot.

As so far described, the apparatus and method for calling a mobile robot in accordance with the present invention have many advantages.

That is, for example, when a user calls the mobile robot from a specific place, the mobile robot can move by itself to the specific space, thereby enhancing users' convenience. For example, by moving the mobile robot such as a robot cleaner to a desired place (a cleaning space or a mobile robot depository) through the remote controller, the user does not need to be troubled by picking up the mobile robot and moving it to the desired place.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for calling a mobile robot comprising:
a radio frequency (RF) generator installed at a remote controller that generates an RF signal for calling a mobile robot when a call signal is inputted by a user by pressing a button;
an infrared ray generator installed at the remote controller that generates an infrared signal for indicating a direction of the remote controller when the call signal is inputted by the user by pressing the button;
an RF receiver installed at the mobile robot that receives the RF signal generated by the RF generator;
a plurality of infrared ray receivers installed at the mobile robot that receive the infrared signal generated by the infrared ray generator; and
a controller installed at the mobile robot that recognizes a direction of the remote controller based on a position of an infrared ray receiver of the plurality of infrared ray receivers that has received the infrared signal, when the RF receiver receives the RF signal, rotates the mobile robot in the recognized direction, and moves the mobile robot in the recognized direction, wherein the controller rotates a front side of the mobile robot in the recognized direction and then moves the mobile robot, and wherein the controller calculates the direction (y) of the remote controller using the following equation:

$$y = 2(\pi/n) \times x$$

wherein 'n' is a total number of the plurality of infrared ray receivers installed at the mobile robot, and 'x' is a position number of the infrared ray receiver that has received the infrared signal generated from the infrared ray generator.

2. A method for calling a mobile robot comprising:
generating a radio frequency (RF) signal and an infrared signal for calling a mobile robot by a remote controller, when a call signal is inputted to the remote controller by a user by pressing a button;
switching an operation mode of the mobile robot to a call mode and calculating a direction of the remote controller based on a position of an infrared ray receiver of a plurality of infrared ray receivers installed at the mobile robot that has received the infrared signal, when the RF signal is received by the mobile robot; and
rotating a front side of the mobile robot in the calculated direction and moving the mobile robot in the calculated direction, wherein the direction (y) of the remote controller is calculated by the following equation:

$$y = 2(\pi/n) \times x$$

wherein 'n' is a total number of the plurality of infrared ray receivers installed at the mobile robot, and 'x' is a position number of the infrared ray receiver that has received the infrared signal.

3. An apparatus for calling a mobile robot comprising:
a radio frequency (RF) generator installed at a remote controller that generates an RF signal for calling a mobile robot when a call signal is inputted by a user by pressing a button;
an ultrasonic wave generator installed at the remote controller that generates an ultrasonic signal for indicating a distance between the mobile robot and the remote controller when the call signal is inputted by the user by pressing the button;
an RF receiver installed at the mobile robot that receives the RF signal generated by the RF generator;
a plurality of ultrasonic wave receivers installed at the mobile robot that receive the ultrasonic signal generated by the ultrasonic wave generator; and
a controller installed at the mobile robot that calculates a direction of the remote controller and a distance between the mobile robot and the remote controller based on a position of an ultrasonic wave receiver of the plurality of ultrasonic wave receivers that has received the ultrasonic signal, when the RF receiver receives the RF signal, and moves the mobile robot to the remote controller based on the calculated direction and distance, wherein the controller detects a time when the ultrasonic signal reaches the ultrasonic wave receiver after being generated from the ultrasonic wave generator based on a time when the RF signal is generated, and the controller calculates a distance between the mobile robot and the remote controller based on the detected time, wherein the controller includes a storing unit that stores a preset position number for discriminating the plurality of ultrasonic wave receivers and calculates a direction of the remote controller based on the position of the ultrasonic wave receiver that has received the ultrasonic signal, wherein when the ultrasonic signal is received by at least two ultrasonic wave receivers, the controller calculates a distance between the mobile robot and the remote controller based on a time when the ultrasonic signal reached the at least two ultrasonic wave receivers, and then calculates an actual distance between the mobile robot and the remote controller through trigonometric measurement based on each calculated distance value, and wherein the controller calculates the distance between the ultrasonic wave receiver and the ultrasonic wave generator by the following equation:

$$S=340[m/\text{sec}]x(T1-T2),$$

wherein 340 [m/sec] is a sonic velocity, T1 is a time when the ultrasonic signal is received, and T2 is a time when the ultrasonic signal is generated after the RE signal is received.

4. The apparatus of claim 3, wherein when an ultrasonic wave receiver receives the ultrasonic signal, the controller calculates a distance between the ultrasonic wave receiver that has received the ultrasonic signal and the remote controller based on the time when the ultrasonic signal reached the ultrasonic wave receiver, and adds a semidiameter of the mobile robot to the calculated distance value, thereby accurately calculating an actual distance between the mobile robot and the remote controller.

5. A method for calling a mobile robot comprising:
simultaneously generating a radio frequency (RF) signal and an ultrasonic signal for calling a mobile robot by a remote controller when a call signal is inputted to the remote controller by a user by pressing a button;

changing an operation mode of the mobile robot to a call mode and calculating a direction of the remote controller based on a position of an ultrasonic wave receiver of a plurality of ultrasonic wave receivers installed at the mobile robot that has received the ultrasonic signal, when the RF signal is received by an RF receiver of the mobile robot;

calculating a distance between the remote controller and the mobile robot based on a time when the ultrasonic signal reaches the ultrasonic wave receiver;

rotating a front side of the mobile robot in the calculated direction; and moving the mobile robot the calculated distance in the calculated direction, wherein when the ultrasonic signal is received by one of the plurality of ultrasonic wave receivers, the distance between the ultrasonic receiver that has received the ultrasonic signal and the remote controller is calculated based on a time when the ultrasonic signal reached the ultrasonic wave receiver, calculating the distance between the mobile robot and the remote controller based on a time when the ultrasonic signal has reached at least two of the ultrasonic wave receivers, when the at least two ultrasonic wave receivers receive the ultrasonic signal; and calculating an actual distance between the mobile robot and the remote controller based on a trigonometric measurement based on each calculated distance value, wherein the distance between the mobile robot and the remote controller is calculated by the following equation:

$$S=340[m/\text{sec}]x(T1-T2),$$

wherein 340 [m/sec] is a sonic velocity, T1 is a time when the ultrasonic signal is received, and T2 is a time when the ultrasonic signal is generated after the RF signal is received.

6. The method of claim 5, wherein calculating the distance comprises:
calculating an actual distance between the mobile robot and the remote controller by adding a semidiameter of the mobile robot to the calculated distance value.

\* \* \* \* \*